United States Patent [19]

Nakayama et al.

[11] 4,078,045

[45] Mar. 7, 1978

[54] PROCESS FOR PRODUCING CARBONYL SULFIDE

[75] Inventors: Yoshiki Nakayama, Shimizu; Hironobu Sano, Fuji; Sataro Okamura; Kazunari Hirao, both of Shizuoka, all of Japan

[73] Assignee: Ihara Chemical Industry Co., Ltd., Tokyo, Japan

[21] Appl. No.: 736,334

[22] Filed: Oct. 28, 1976

[30] Foreign Application Priority Data

Apr. 28, 1976 Japan .................................. 51-48944

[51] Int. Cl.$^2$ ............................................. C01B 31/26
[52] U.S. Cl. ...................................................... 423/416
[58] Field of Search ................................. 423/414–416

[56] References Cited

U.S. PATENT DOCUMENTS

| 2,992,897 | 7/1961 | Applegath et al. | 423/416 |
| 3,764,661 | 10/1973 | Kanazawa et al. | 423/416 |

Primary Examiner—Earl C. Thomas
Attorney, Agent, or Firm—Oblon, Fisher, Spivak, McClelland & Maier

[57] ABSTRACT

Carbonyl sulfide is produced by reacting carbon monoxide with sulfur in the presence of an alkaline earth metal compound selected from the group consisting of calcium, strontium or barium sulfides sulfates and halides.

6 Claims, 1 Drawing Figure

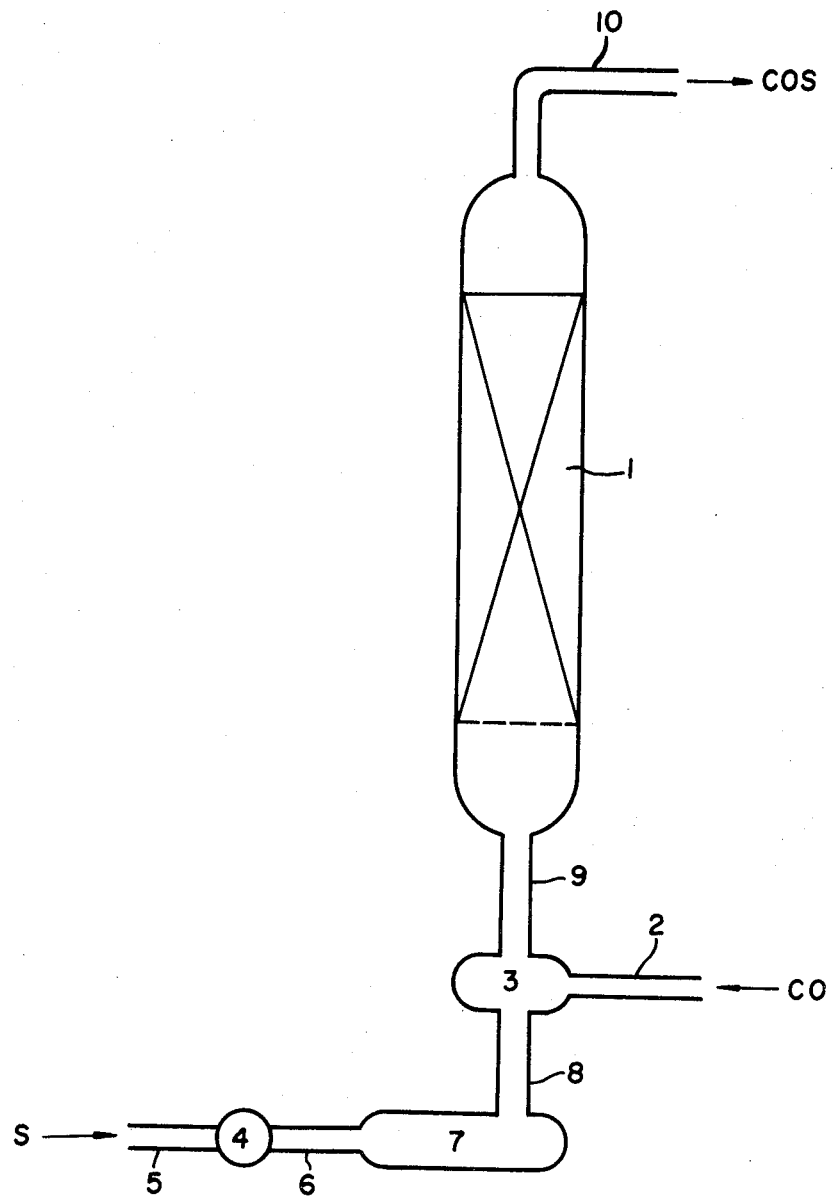

PROCESS FOR PRODUCING CARBONYL SULFIDE

BACKGROUND OF THE INVENTION

The present invention relates to an improved process for producing carbonyl sulfide which is useful as the intermediate for agriculture chemicals, medicines and other chemical compounds.

More particularly, it relates to a process for selectively producing carbonyl sulfide having high purity in high efficiency by reacting carbon monoxide with sulfur in the presence of a special catalyst at relatively low temperature under preventing the formation of by-product of carbon disulfide and decreasing the formation of carbon dioxide.

As the process for producing carbonyl sulfide by reacting carbon monoxide with sulfur, it has been proposed to react carbon monoxide with sulfur at relatively high temperature of 350° to 510° C (West German Pat. No. 1,222,024) and to react carbon monoxide with sulfur at relatively low temperature of 260° to 483° C (500° to 900° F) in the presence of an aluminosilicate having a three dimensional structure (U.S. Pat. No. 2,983,580) and to react carbon monoxide with sulfur in the presence of a sulfide having a metal selected from the group consisting of metals in the V, VI, VII and VIII groups of the periodic table (U.S. Pat. No. 3,416,893 and British Pat. No. 957,102) and to react carbon monoxide with sulfur in the presence of an alkali metal sulfide such as sodium and potassiun sulfides (Japanese Patent Publication No. 27632/1972 and U.S. Pat. No. 3,764,661).

However, the inventors have studied and have found that the reaction velocity in the reaction of carbon monoxide with sulfur at 350° to 510° C is remarkably low whereby it is necessary to give remarkably long reaction time for producing carbonyl sulfide in high yield at the temperature.

However, when the reaction time is long, it is difficult to prevent the formation of the by-products of carbon disulfide and carbon dioxide. On the other hand, when the reaction temperature is high for imparting high reaction velocity, the reverse reaction to decompose carbonyl sulfide is caused to decrease the content of the resulting carbonyl sulfide and to increase the contents of carbon monoxide and sulfur, and the metal corrosive action of carbonyl sulfinyl at high temperature is increased to corrode the substrate of the reactor disadvantageously.

In the process for reacting carbon monoxide with sulfur in the presence of aluminosilicate, the selectivity given by the aluminosilicate used as the catalyst is not satisfactory whereby the by-products of carbon disulfide and carbon dioxide can not be prevented.

In the process for reacting carbon monoxide with sulfur in the presence of a metal sulfide having a metal selected from the group consisting of the V, VI VII and VIII groups of the periodic table, all of the metal sulfides used as the catalyst has low selectivity whereby it has been difficult to prevent the formation of the by-products of carbon disulfide and carbon dioxide, and it has been difficult to impart high catalytic activity.

Accordingly, in order to produce carbonyl sulfide under minimizing the formation of the by-products of carbon disulfide and carbon dioxide, it is necessary to react carbon monoxide with sulfur in relatively low conversion that is low reaction efficiency though the catalytic activity is not enough high.

However, when the conversion is low, carbon monoxide of the unreacted material contained in the reaction mixture gas at high ratio should be separated and recovered from carbonyl sulfide. Accordingly, the process is not satisfactory for the industrial operation.

On the other hand, in the process for reacting carbon monoxide with sulfur in the presence of the alkali metal sulfide such as sodium or potassium sulfide, the catalytic activity of the alkali metal sulfide is remarkably high, whereby the catalysts are suitable for increasing the reaction velocity for the reaction of carbon monoxide with sulfur. However, as the result, the selectivity is low and it is difficult to prevent the formation of the by-products of carbon disulfide and carbon dioxide.

The object compound of carbonyl sulfide is the useful intermediate for the source of thiolcarbonyl group —CO—S— and carbonyl group $>C = O$, and is especially important as the intermediate for the thiolcarbamic acid derivatives and urea derivatives.

The reaction of carbonyl sulfide is similar to that of carbon disulfide. For example, carbonyl sulfide reacts with secondary amines in the presence of an alkali metal hydroxide to produce thiolcarbamic acid salts. (Reaction formula I). On the other hand, carbon disulfide also reacts with secondary amines to produce dithiocarbamic acid salts (Reaction formula II).

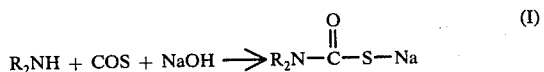

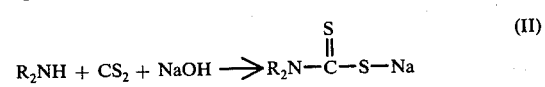

Carbonyl sulfide reacts with primary amines to produce urea. (Reaction formula III). On the other hand, carbon disulfide also reacts with primary amines to produce thiourea. (Reaction formula IV).

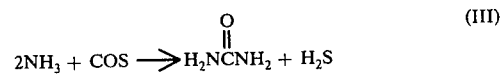

On the other hand, carbon dioxide is not cause trouble as carbon disulfide. For example, carbon dioxide reacts with a metal hydroxide to produce carbonate. In order to produce urea severe reaction condition at high temperature under high pressure is required.

The separation of carbon dioxide from carbonyl sulfide is relatively easy in comparison with the separation of carbon disulfide from carbonyl sulfide.

Accordingly, when the urea derivatives and the thiolcarbamic acid derivatives are produced by using carbonyl sulfide containing the by-product of carbon disulfide, the reactions similar to the reaction formula (I) to (IV) are caused to decrease the purity of the products, disadvantageously.

However, it has not been possible to selectively produce carbonyl sulfide under completely preventing the formation of the by-product of carbon disulfide by the conventional processes.

SUMMARY OF THE INVENTION

It is an object of the present invention to provide a process for selectively producing carbonyl sulfide having high purity in high yield and high efficiency under preventing the formation of the by-products of carbon disulfide and carbon dioxide at relatively low reaction temperature.

The object of the invention has been attained by producing carbonyl sulfide by reacting carbon monoxide with sulfur in the presence of an alkaline earth metal compound selected from the group consisting of calcium, strontium or barium sulfides sulfates and halides.

BRIEF DESCRIPTION OF THE DRAWING

The drawing FIGURE illustrates an apparatus for use in the process of the present invention.

DETAILED DESCRIPTION OF THE EMBODIMENTS

The calcium, strontium or barium sulfides, sulfates and halides used in the process of the invention include calcium sulfide, strontium sulfide, barium sulfide, calcium sulfate, strontium sulfate, barium sulfate, calcium chloride, strontium chloride, barium chloride, calcium bromide, strontium bromide, barium bromide, calcium iodide, strontium iodide, barium iodide, calcium fluoride, strontium fluoride, barium fluoride. As the calcium, strontium or barium sulfide, it is possible to use the sulfide which is produced by converting calcium, strontium or barium oxide, or calcium, strontium or barium carbonate or calcium, strontium or barium hydroxide with sulfur, hydrogen sulfide, carbon disulfide or carbonyl sulfide at 100° to 1,500° C for 30 minutes to 10 hours preferably at 200° to 700° C for 3 to 5 hours. Thus, the bromides and iodides are not preferable because they are easily decomposed.

The process of the invention can be carried out by contacting a mixed gas of carbon monoxide and sulfur with the surface of the catalyst of the specific alkaline earth metal compound heated at 250° to 450° C preferably 300° to 400° C.

The ratio of carbon monoxide to sulfur in the process of the invention is preferably about 1:1. It is possible to use 3 to 5 moles of sulfur per 1 mole of carbon monoxide.

The amount of the catalyst is in a range of 0.2 to 50 preferably 1 to 20 (g.hr/CO.N$l$) by W/F per the carbon monoxide fed.

In the process of the invention, the reaction temperature is relatively low as 250° to 450° C. The reaction pressure is not limited as far as sulfur fed as the source is in gaseous form, and can be the atmospheric pressure or lower or higher.

The reaction time is in a range of 0.5 second to 1 minute usually 1 to 30 seconds.

As the method of contacting the mixed gas of carbon monoxide and sulfur with the catalyst of the specific alkaline earth metal compound, it is advantageous to employ a method passing the mixed gas through a reaction tube whose inner wall was coated with the catalyst of the specific alkaline earth metal compound or a method of feeding the mixed gas into a reaction tower filled with the catalyst of the specific alkaline earth metal compound.

The resulting carbonyl sulfide had remarkably high purity of higher than 96 mole % without the by-product of carbon disulfide and with a small amount of the by-product of carbon dioxide.

The advantages and characteristics of the invention will be illustrated.

(1) It is possible to selectively produce carbonyl sulfide having high purity in high efficiency without formation of the by-product of carbon disulfide under inhibiting the formation of carbon dioxide.

(2) It is possible to remarkably shorten the reaction time for reacting carbon monoxide with sulfur, whereby the reactor can be miniaturize.

(3) It is possible to carry out the reaction at low reaction temperature in mild condition. The catalyst used in the process of the invention inhibit the side reaction without decomposing the resulting carbonyl sulfide whereby carbonyl sulfide having high purity can be obtained.

(4) It is possible to treat carbonyl sulfide at relatively low temperature whereby the corrosion of the substrate of the reactor can be prevented, and the life of the reactor can be remarkably prolonged.

(5) The by-product of carbon disulfide is not formed and the amount of carbon monoxide remained as the unreacted product is remarkably small, whereby a steps of separation and purification are not needed and the process is simplified and the control of the production can be easy.

Referring to the drawing, one embodiment of the invention will be illustrated.

The specific alkaline earth metal compound is filled in the quartz glass reaction column 1 and an inert gas such as nitrogen gas is passed through the reaction column to purge air with the inert gas. The reaction column 1 is heated at 250° to 450° C and carbon monoxide is fed from the inlet 2 to the mixer 3 at a rate of 0.1 to 15 Nl/min., and simultaneously, liquid sulfur is fed from the inlet 5 through a heated pipe 6 to a sulfur boiler 7 by a pump (constant volume) 4 at a rate of 0.1 to 25 g/min. so as to be substantially equal mole ratio to that of carbon monoxide whereby sulfur is vaporized.

The gaseous sulfur is fed through a heated pipe 8 to the mixer 3 to form a mixed gas of carbon monoxide and sulfur.

The mixed gas is fed through a heated pipe 9 to the reaction column 1 thereby reacting them to form carbonyl sulfide. The resulting carbonyl sulfide is taken out from the outlet 10 at the upper part of the reaction column.

The invention will be further illustrated by certain examples and references.

EXAMPLE 1

The above-mentioned apparatus was used. A specific amount of each alkaline earth metal compound was filled in the quartz glass reaction column and an inert gas such as nitrogen gas was passed through it to purge air with the inert gas and the alkaline earth metal column was heated to control the temperature. The flow rate of carbon monoxide was controlled and sulfur was fed into the sulfur boiler by the pump for constant feed or sulfur.

The sulfur boiler was heated to adjust the mole ratio of carbon monoxide to sulfur and the mixed gas of carbon monoxide and sulfur were contacted with the specific alkaline earth metal compound to react them.

Th resulting gas was cooled and was sampled by a gas sampler for a specific amount and the components of the resulting gas were measured according to a gas chromatography analysis.

Thus, the test was repeated by using various metal compounds.

The results are shown in Table 1.

Table 1

| Exp. Test No. | Metal compound in reaction column and amount | | T (°C) | Feed rate of CO (Nl/min) | S/CO | Components in resulting gas (mole %) | | | |
|---|---|---|---|---|---|---|---|---|---|
| | | (g) | | | | COS | CO | CO$_2$ | CS$_2$ |
| 1 | CaS | 50 g | 360 | 1.0 | 1.1/1 | 95.38 | 4.28 | 0.34 | — |
| 2 | SrS | 50 g | 360 | 0.4 | 1.1/1 | 97.15 | 2.38 | 0.47 | — |
| 3 | BaS | 50 g | 380 | 0.1 | 1.1/1 | 97.69 | 1.78 | 0.53 | — |
| 4 | CaS<br>BaS | 15 g<br>15 g | 380 | 0.1 | 1.1/1 | 97.95 | 1.58 | 0.47 | — |
| 5 | CaSO$_4$ | 50 g | 380 | 0.4 | 1.1/1 | 97.90 | 1.49 | 0.61 | — |
| 6 | SrSO$_4$ | 30 g | 370 | 0.24 | 1.1/1 | 96.10 | 3.30 | 0.60 | — |
| 7 | BaSO$_4$ | 30 g | 400 | 0.06 | 1.1/1 | 95.83 | 3.63 | 0.54 | — |
| 8 | CaSO$_4$<br>CaCl$_2$ | 40 g<br>10 g | 370 | 0.2 | 1.1/1 | 96.43 | 3.15 | 0.42 | — |
| 9 | CaCl$_2$ | 30 g | 360 | 0.2 | 1.1/1 | 96.24 | 3.27 | 0.49 | — |
| 10 | CaF$_2$ | 30 g | 370 | 0.2 | 1.1/1 | 96.44 | 3.11 | 0.45 | — |
| 11 | SrCl$_2$ | 50 g | 370 | 0.1 | 1.1/1 | 95.44 | 4.21 | 0.35 | — |
| 12 | BaCl$_2$ | 50 g | 370 | 0.1 | 1.1/1 | 94.73 | 4.86 | 0.41 | — |

| Ref. Test No. | Metal compound in reaction column and amount | | T (°C) | Feed rate of CO (Nl/min) | S/CO | Components in resulting gas (mole %) | | | |
|---|---|---|---|---|---|---|---|---|---|
| | | (g) | | | | COS | CO | CO$_2$ | CS$_2$ |
| 1 | MgS | 30 g | 360 | 0.4 | 1.1/1 | 72.05 | 8.23 | 7.04 | 12.68 |
| 2 | α-Al$_2$O$_3$ | 15 g | 370 | 0.2 | 1.1/1 | 74.87 | 4.11 | 11.42 | 9.60 |
| 3 | K$_2$S | 15 g | 370 | 0.2 | 1.1/1 | 90.90 | 2.27 | 4.02 | 2.60 |
| 4 | Co$_2$S$_3$ | 15 g | 350 | 0.2 | 1.1/1 | 87.35 | 1.84 | 7.13 | 3.68 |
| 5 | none | | 350 | 0.1 | 1.1/1 | 15.48 | 84.37 | 0.15 | — |

Note:
T Temperature in the metal compound layer.
S/CO Mole ratio of S to CO.

EXAMPLE 2

A small amount of water was added to each 30 g of calcium hydroxide, strontium hydroxide or barium hydroxide and the mixture was kneaded and molded and dried to form cylindrical pellets having a diameter of 4 mm and a height of 5 mm. The pellets were filled in a quartz glass column having a diameter of 4 cm.

A gaseous sulfur was fed together with nitrogen gas from the bottom of the column and the column was heated at 400° to 500° C for 3 hours whereby each pale yellow cylindrical metal compound filler was prepared.

In accordance with the process of Example 1, the mixed gas of carbon monoxide and sulfur was contacted with the metal compound filler to react them and the components of the resulting gas were analyzed.

The results are shown in Table 2.

EXAMPLE 3

In accordance with the process of Example 2, each 30 g of calcium carbonate, strontium carbonate or barium carbonate was heated in the gaseous sulfur to prepare each metal compound filler.

In accordance with the process of Example 1, the mixed gas of carbon monoxide and sulfur was contacted with the metal compound filler to react them and the components of the resulting gas were measured.

The results are shown in Table 2.

Table 2

| Test No. | Metal compound filler | T (°C) | Feed rate of CO (Nl/min.) | S/CO | Components in resulting gas (mole %) | | | |
|---|---|---|---|---|---|---|---|---|
| | | | | | COS | CO | CO$_2$ | CS$_2$ |
| 1 | *1 | 380 | 0.2 | 1.1/1 | 97.24 | 2.11 | 0.65 | — |
| 2 | *2 | 380 | 0.1 | 1.1/1 | 95.01 | 4.52 | 0.47 | — |
| 3 | *3 | 380 | 0.1 | 1.1/1 | 95.67 | 3.81 | 0.52 | — |
| 4 | *4 | 380 | 0.2 | 1.1/1 | 96.73 | 2.40 | 0.87 | — |
| 5 | *5 | 380 | 0.1 | 1.1/1 | 95.50 | 3.49 | 1.01 | — |

Table 2-continued

| Test No. | Metal compound filler | T (°C) | Feed rate of CO (Nl/min.) | S/CO | Components in resulting gas (mole %) | | | |
|---|---|---|---|---|---|---|---|---|
| | | | | | COS | CO | CO$_2$ | CS$_2$ |
| 6 | *6 | 380 | 0.1 | 1.1/1 | 95.22 | 3.88 | 0.90 | — |

Note:
*1 Filler obtained by heating Ca(OH)$_2$ in gaseous sulfur
*2 Filler obtained by heating Sr(OH)$_2$ in gaseous sulfur
*3 Filler obtained by heating Ba(OH)$_2$ in gaseous sulfur
*4 Filler obtained by heating CaCO$_3$ in gaseous sulfur
*5 Filler obtained by heating SrCO$_3$ in gaseous sulfur
*6 Filler obtained by heating BaCO$_3$ in gaseous sulfur
T and S/CO are shown in Table 1 of Example 1.

What is claimed is:

1. A process for producing carbonyl sulfide which comprises reacting carbon monoxide with sulfur at a temperature of from 250°–450° C in the presence of a catalyst comprising an alkaline earth metal compound selected from the group consisting of calcium, strontium and barium sulfides, sulfates and halides.

2. The process of claim 1, wherein said alkaline earth metal compound is calcium sulfide, strontium sulfide, barium sulfide, calcium sulfate, strontium sulfate, barium sulfate, calcium chloride, strontium chloride, barium chloride, calcium bromide, strontium bromide, barium bromide, calcium iodide, strontium iodide, barium iodide, calcium fluoride, strontium fluoride or barium fluoride.

3. The process of claim 1, wherein said alkaline earth metal compound is an alkaline earth metal sulfide produced by heating calcium oxide, strontium oxide, barium oxide, calcium carbonate, strontium carbonate, barium carbonate, calcium hydroxide, strontium hydroxide, or barium hydroxide in gaseous sulfur, hydrogen sulfide, carbon disulfide or carbonyl sulfide.

4. The process of claim 1, wherein the mole ratio of carbon monoxide to sulfur is 1:1 – 5.

5. The process of claim 1, wherein said catalyst is filled in a reaction column or is formed on an inner wall of a reaction column.

6. The process of claim 1, wherein the ratio of said catalyst is 0.2 to 50 g.hr per 1 Nl of carbon monoxide flow.

* * * * *